United States Patent [19]

Olesen et al.

[11] Patent Number: 4,559,536
[45] Date of Patent: Dec. 17, 1985

[54] DATA TRANSMISSION DEVICE

[76] Inventors: Lykke Olesen, Granve,uml/a/ gen 4, S-130 40 Djurhamn; Bo Lindgren, Musserongången 285, S-135 34 Tyresö, both of Sweden

[21] Appl. No.: 459,085

[22] Filed: Jan. 19, 1983

[30] Foreign Application Priority Data

Jan. 19, 1982 [SE] Sweden ................................ 8200269

[51] Int. Cl.[4] ...................... H04Q 9/00; G08B 19/00; G06F 3/04
[52] U.S. Cl. .............................. 340/825.07; 340/518; 340/825.65
[58] Field of Search ...................... 340/825.07, 825.52, 340/825.65, 825.68, 825.57, 518; 307/10 R

[56] References Cited

U.S. PATENT DOCUMENTS

| 3,921,139 | 11/1975 | Hardesty, Jr. et al. | 340/825.52 |
| 4,091,361 | 5/1978 | Eichelberger et al. | 340/825.68 |
| 4,206,449 | 6/1980 | Galvin et al. | 340/518 |
| 4,435,706 | 3/1984 | Callan | 340/825.65 |

FOREIGN PATENT DOCUMENTS 1105973 3/1968 United Kingdom .
1427133 3/1974 United Kingdom .
1565943 4/1980 United Kingdom .

Primary Examiner—Donald J. Yusko
Attorney, Agent, or Firm—Pollock, Vande Sande & Priddy

[57] ABSTRACT

A data transmission device having a plurality of monitor units which are wire connected in series to a computer. During a working cycle, one unit after the other is activated by emission of clock pulses from the computer. The clock pulses are counted in an address counter (4) in the respective unit. Upon reaching a count value preset in an address coder (7) a sequential circuit (6) is activated, the latter consisting of a binary counter (3) and a functional decoder (5) connected thereto. At the same time as clock pulses corresponding to the address of the unit are received via a clock pulse connection ("clock"), a pulse train is emitted via switches (A,B,C,D), the positions of which corresponding to sensed information bits, to a data transmission connection ("data"). The outputs of the sequential circuit (6) are also connected to a control circuit (9) for generating control signals to the particular monitor unit or a sub-system connected thereto.

8 Claims, 3 Drawing Figures

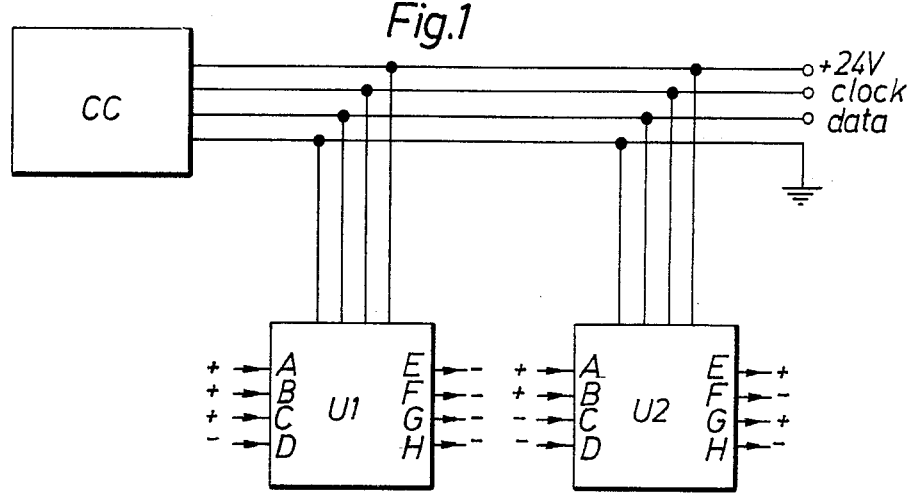
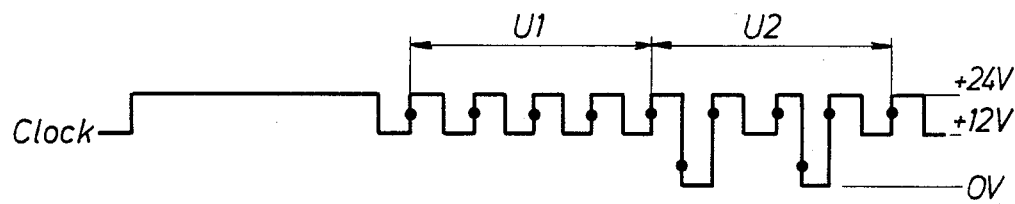
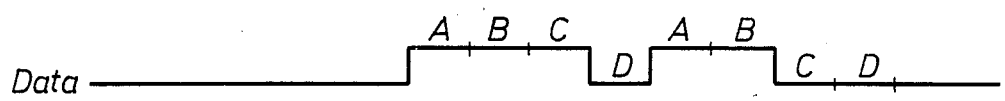

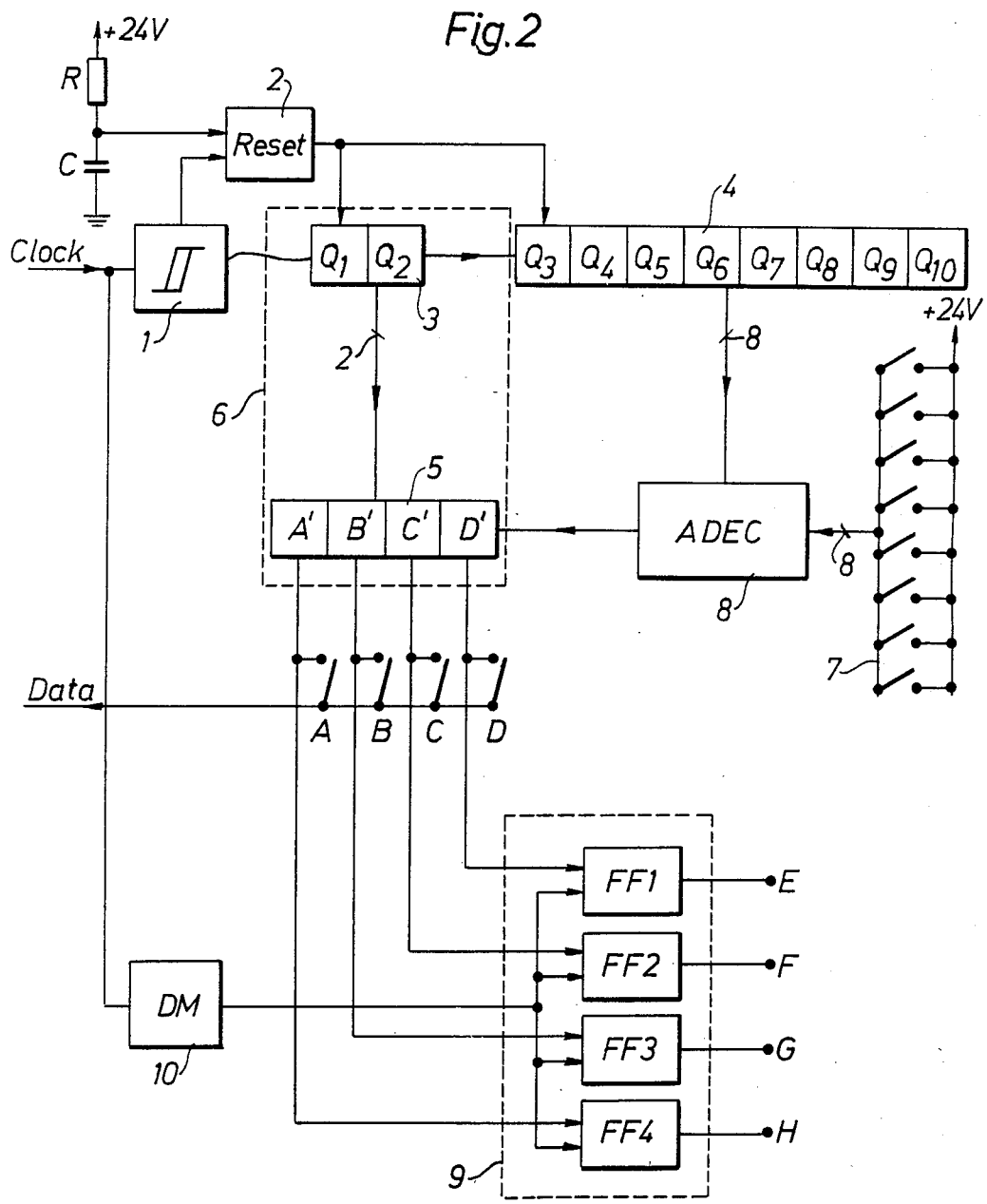

DATA TRANSMISSION DEVICE

The present invention concerns a data transmission device of the kind comprising a plurality of monitor units, which are wire connected to a computer and which, during a working cycle, are activated one after the other by the emission of clock pulses from the computer, these clock pulses being counted in an address counter disposed in each monitor unit, said address counter, upon reaching a predetermined count value, initiates the transmission of sensed information to the computer.

Such a device can be used for central monitoring of a plurality of various units, sensors or sub-systems which via a wire connection are connected in series to a common computer, possibly in the form of a star type network, wherein each branch contains a number of serially connected units to be monitored. The monitoring involves detection and possibly also control of one or more state variables of each unit.

Prevìsously known monitoring devices of this kind normally work with a certain time division of the monitoring process in such a way that a first time period is used for addressing the unit and an adjoining time period is used for returning sensed information to the computer (or transmission of control signals from the computer to the unit) via one and the same conduit wire. However, this requires rather complicated electronic circuits and components in each monitor unit for administering and switching between the addressing and data transmission phases. For example, each monitor unit is normally provided with its own synchronizing generator, various receiver and transmitter circuits and logical circuits for alternating activation of the receiver and transmitter circuits.

The object of the invention is to achieve a simplified and less expensive circuit solution in each monitor unit, such circuit solution also enabling a quicker response reaction in each unit while eliminating the synchronizing problems and permitting the clock pulse frequency and the pulse ratio (the ratio between the time duration of each pulse and the time duration between two subsequent pulses) to vary, e.g. for adaptation to different transmission conditions or disturbances. Another object is to enable a central control of each monitored unit from the computer by relatively simple means.

These objects are achieved for a device of the kind stated initially, according to the invention, in that each monitor unit is connected to the computer via at least two connections, one of which serving to transmit the clock pulses and the other serving to transmit sensed data information, that each monitor unit comprises a sequential circuit, the inputs of which are connected to the clock pulse connection as well as, via an address decoder, to said address counter and the outputs of which are connected to the data transmission connection via a respective switch, which by its open or closed state represents a sensed bit of information, and that each monitor unit, when the address decoder senses the predetermined count value of the address counter, is caused to transmit a pulse train corresponding to the sensed information bits substantially in synchronism with said clock pulses. Hereby, the return of sensed data will be effected practically without delay in relation to the received clock pulses from the computer.

Moreover, the circuit solution is particularly simple, and the sequential circuit can preferably consist of, on the one hand, a binary counter coupled to the clock pulse connection and, on the other hand, a functional decoder connected thereto and to the address decoder, the outputs of the functional decoder being connected to each one of said switches. The functional decoder is incremented cyclicly by the binary counter but is activated on its outputs only when the address decoder senses the present count value of the address counter. The binary counter can have a desired number of bits and is preferably connected between the clock pulse connection and the address counter, it being automatically secured that the address counter changes its count value in synchronism with the cyclic switching of the functional decoder. Thus, no synchronizing problems will appear.

The synchronisation of the various sensing units in relation to each other is preferably carried out in that each unit has a reset circuit connected so as to sense the clock pulses and to reset the respective address counter upon the application of an extremely long pulse.

In order to permit the emission of control signals from the computer to each monitor unit, the outputs of the sequential circuit are preferably connected to a control circuit, which is actuatable by modulating the clock pulses for generating control signals to the respective monitor unit or a subsystem connected thereto. Even the control function will thus be substantially in synchronism with the received clock pulses.

The control circuit has preferably two inputs, namely a first input with connections to the outputs of the sequential circuit and a second input, which via a pulse demodulator, e.g. a pulse level sensor, is connected to the clock pulse connection of the monitor unit in such a way that the control circuit is activated only when modulated clock pulses, in particular having a predetermined potential level, are detected.

The control circuit may comprise a number of flip-flops, the inputs of which are connected on the one hand to a corresponding output of the sequential circuit, and on the other hand, to the pulse demodulator. The outputs of the flip-flops are preferably connected to an associated control means, e.g. via a relay.

The invention will be explained further below with reference to the appended drawings, which schematically illustrate an embodiment.

FIG. 1 shows schematically a computer and two monitor units being wire connected thereto;

FIG. 2 shows a schematical block diagram of a monitor unit; and

FIG. 3 shows an example of the signal on the inputs and outputs of a monitor unit.

Thus, in FIG. 1 there is shown, very simplified, a central computer CC, which by means of four conduit wires is connected to two monitor units U1 and U2. In practical applications, the number of monitor units can be very great, and the conduit network can comprise various configurations, e.g. with several branches extending in star formation from the computer, which can be constituted by a micro computer or a larger computer.

Among the four conduit wires, two of them serve as the power supply to the various units, namely +24V and earth, whereas two wires serve for the signal transmission. One signal wire "clock" is intended for the transmission of clock pulses from the computer to the various monitor units, and the other signal conduit "data" is intended for the return of data signals representing sensed information from the respective monitor unit to the computer. In principle, it is conceivable that the power supply of the various units is locally accomplished, e.g. by battery operation, and that the clock pulses and the data signals are superposed on the same conduit.

The two monitor units U1 and U2 have, apart from the four connections to the computer, four inputs A,B,C,D for sensing four binary state variables or one or more binary coded variables, wherein each bit is represented by + or − in FIG. 1, and four outputs E,F,G,H for emitting four binary control signals, likewise represented by + and −.

FIG. 2 shows the principle structure of a monitor unit according to the invention, and only the most essential signal paths are drawn. To the left in the figure, the two signal connections "clock" and "data" are shown. The clock pulse connection "clock" is provided with a pulse former 1, which is intended to eliminate minor disturbances, which are superposed on the clock pulses emitted from the computer. The pulse former 1 is on its output side connected to, on the one hand, a reset circuit 2, and on the other hand, to a binary counter 3 and an address counter coupled thereto. The binary counter 3 contains two cells $Q_1$ and $Q_2$ and thus counts cyclicly to four. Every fourth clock pulse is thus transferred to the address counter 4. The binary counter 3 is connected through two conduit connections, one for each cell $Q_1$, $Q_2$, to a functional decoder 5, and these two components 3 and 5 together form a sequential circuit 6 having four outputs.

Each monitor unit U1,U2, etc. has an address coder 7 for presetting of a specific address code for each unit. The cells $Q_3$, $Q_4$, ..., $Q_{10}$ of the address counter 4 and the address coder 7 are each connected to an address decoder 8 with a number of conduits corresponding to the number of counter cells, in this case eight of them. The address decoder 8 is adapted to compare the count value of the address counter 4 and the preset value of the address coder 7 and, upon coincidence, to emit an actuating signal to the functional decoder 5 of the sequential circuit 6. Here, the four cells A′,B′,C′, D′ of the functional decoder 5 will be actuated one after the other in synchronism with the clock pulses via the binary counter 3, so that pulses are emitted in sequence on the outputs of the cells A′,B′,C′,D′. This occurs thus essentially in synchronism with the four clock pulses which correspond to the address of the particular monitor unit. These pulses emitted in sequence are emitted to the data connection "data" of the unit via a respective switch A,B,C,D. These switches are presumed to be set in open or closed position in response to a respective sensed state variable. Thus, only those pulses, which reach a closed switch, will be returned to the computer via the data connection "data".

The time sequence is illustrated in FIG. 3, where the two upper curves represent the clock pulses emitted from the computer and the returned data signals, respectively. A first, very long pulse (e.g. corresponding to about ten or twenty clock pulses) ensures that the counters 3,4 of each monitor unit are reset by means of the respective reset circuit 2. Thereupon, a great number of clock pulses, uniformly distributed in time, follow. The address coders 7 of the various monitor units are presumed to be preset to a respective, specific value, so that only one unit is activated at a time. In this case, the unit U1 is assumed to have the address "1" and the unit U2 the address "2". In accordance with FIG. 1, the switches A,B and C of the unit U1 are presumed to be closed, whereas only the switches A and B of the unit U2 are closed. Immediately after the reset signal, the monitor unit will thus emit three positive pulses on the data connection, corresponding to the sensed information bits at the switches A,B and C, substantially at the same time as the clock pulses are received on the clock pulse connection. Correspondingly, positive pulses are emitted from the monitor unit U2 to the computer in synchronism with the associated clock pulses.

As mentioned above, the monitor units U1, U2, etc. can also be controlled from the computer CC. For this purpose, the outputs of the sequential circuit 6 from the cells A′, B′, C′, D′ of the functional decoder 5 are connected to a control circuit 9, which is also connected to the clock pulse connection "clock" via a clock pulse demodulator 10. In the shown embodiment, the latter is constituted by a pulse level sensor and gives a positive output signal only when clock pulses having a preset potential level are sensed. For example, the computer CC can emit clock pulses with two different potential levels, either between +12 V and +24 V or between 0 V and +24 V, as illustrated in FIG. 3. In the case shown, the pulse demodulator reacts on especially deep clock pulses.

The control circuit 9 consists of four bistable flip-flops FF1, FF2, FF3 and FF4, each one having one input connected to a corresponding output of the functional decoder 5 and the other input connected to the pulse demodulator 10. The respective outputs E,F,G,H of the flip-flops can be connected to desired control devices for each monitor unit, e.g. via an associated relay. The four lower time diagrams in FIG. 3 illustrate the potential variations on the outputs E,F,G,H of the control circuit 9 in the units U1 and U2, respectively. It will be noted that the control signals are also emitted essentially in synchronism with the clock pulses which correspond to the address of the particular monitor unit.

The device can be modified in numerous ways within the scope of the invention idea defined in claim 1. Thus, the number of cells of the counters 3 and 4 can be varied at will (and in a corresponding manner the number of sensed information bits A,B,C,D of the respective monitor unit). Furthermore, the clock pulses can be modulated with respect to the pulse width instead of the pulse height and, as mentioned above, the clock and data pulses can be superposed on one and the same conduit, e.g. by substantially different pulse width and/or pulse height.

Of course, the invention can advantageously be applied on a number of various fields, e.g. for monitoring industrial processes, state variables in various kinds of vehicles and machines as well as operational monitoring of electrical or communication cables. In the case of communication cables, one or two conduit pairs in the cable can advantageously be used for signal transmission and possibly also for power supply.

We claim:

1. Data transmission device, comprising a plurality of monitor units ($U_1$, $U_2$ ... ), which are connected in parallel to a computer (CC) and which, during a working cycle, are activated one after the other by the emission of clock pulses from the computer, said clock pulses being counted in an address counter (4) disposed in each unit, said address counter, upon reaching a predetermined (7) count value, securing that sensed information is transmitted to the computer, each monitor unit ($U_1$, $U_2$) being connected to the computer (CC) via at least two connections, one of which ("clock") serving to transmit said clock pulses from the computer (CC) and the other ("data") serving to transmit sensed data information from the particular monitor unit (U$_1$, U$_2$ . . . ), characterized in that each monitor unit comprises:

a binary counter (3), the input of which is coupled to the clock pulse connection ("clock") and the output of which is connected to a functional decoder (5), so that the clock pulses will cyclically increment said functional decoder (5);

an address counter (4), the input of which is coupled to the clock pulse connection so as to be incremented each time said binary counter (3) starts a new counting cycle and the output of which (4) is connected via an address decoder (8) to said functional decoder (5) so as to activate the latter upon reaching said predetermined count value of the address counter (4);

switching means including a plurality of switches (A, B, C, D) coupled between a respective output of said functional decoder (5) and said data transmission connection ("data") for representing by open or closed states of said switches, a sensed bit of information of a plurality of bits of information;

whereby, when said functional decoder (5) is activated upon reaching said predetermined count value of the particular monitor unit, a pulse train representing sensed information is emitted in sequence at the data transmission connection ("data") substantially in synchronism with the clock pulses received at the clock pulse connection ("clock").

2. Data transmission device as defined in claim 1, characterized in that said binary counter (3) is connected between the clock pulse connection ("clock") and said address counter (4).

3. Data transmission device as defined in claim 1 or 2, characterized in that a reset circuit (2) is connected for sensing the clock pulses and resetting said binary counter (3) and said address counter (4) upon the application of an extremely long pulse.

4. Data transmission device as defined in any one of claims 1–3 characterized in that the outputs (A', B', C', D') of said functional decoder (5) are connected to control circuit means (9) actuatable by modulation of the clock pulses for generating control signals to the respective monitor unit or a sub-system connected thereto.

5. Data transmission device as defined in claim 4, characterized in that the control circuit means (9) has two inputs, namely a first input with connections to the outputs (A', B', C', D') of said functional decoder (5) and a second input, which via pulse demodulator (10) is connected to the clock pulse connection ("clock") of the monitor unit so that the control circuit means (9) is actuated only when modulated clock pulses are detected.

6. Data transmission device as defined in claim 5, characterized in that said pulse demodulator (10) comprises a pulse level sensor, which actuates the control circuit means upon sensing clock pulses having a predetermined potential level.

7. Data transmission device as defined in claim 6, characterized in that the control circuit means comprises bistable flip-flops (FF1, FF2, FF3, FF4) the inputs of which are connected, on the one hand to each one of the outputs (A', B', C', D') of said functional decoder (5) and, on the other hand, to said pulse demodulator (10).

8. Data transmission device as defined in claim 7, characterized in that the outputs (E, F, G, H) of the flip-flops are connected to an associated control device, e.g. via a relay.

* * * * *

UNITED STATES PATENT AND TRADEMARK OFFICE
CERTIFICATE OF CORRECTION

PATENT NO. : 4,559,536
DATED : December 17, 1985
INVENTOR(S) : Lykke Olesen and Bo Lindgren It is certified that error appears in the above—identified patent and that said Letters Patent is hereby corrected as shown below:

On the title page:

Inventor Lykke Olesen's address should read as follows:

--Granvägen 4, S-130 40 Djurhamn, Sweden--

Signed and Sealed this

Twenty-fifth Day of February 1986

[SEAL]

Attest:

DONALD J. QUIGG

Attesting Officer

Commissioner of Patents and Trademarks